United States Patent [19]

Sugiyama et al.

[11] 4,340,783
[45] Jul. 20, 1982

[54] VOICE FREQUENCY RESPONSE SYSTEM

[75] Inventors: Tomonori Sugiyama, Fujisawa; Akio Suehiro, Shimoda, both of Japan

[73] Assignee: Hitachi, Ltd., Tokyo, Japan

[21] Appl. No.: 159,223

[22] Filed: Jun. 13, 1980

[30] Foreign Application Priority Data

Jun. 19, 1979 [JP] Japan .................................. 54-76299

[51] Int. Cl.³ ............................................. H04M 11/00
[52] U.S. Cl. ................................. 179/2 A; 179/2 DP
[58] Field of Search ............... 179/2 A, 2 DP, 1 VC, 179/1 SW, 6.07, 6.11, 3, 4; 178/2 R, 3, 4.1 R, 4.1 B

[56] References Cited

U.S. PATENT DOCUMENTS 4,055,729 10/1977 Vandling ......................... 179/2 DP
4,122,307 10/1978 Suehiro ............................... 179/2 A Primary Examiner—Joseph A. Popek
Attorney, Agent, or Firm—Craig and Antonelli

[57] ABSTRACT

A voice frequency response system comprising a subscriber's terminal unit including both a functional part functioning as a telephone and a functional part functioning as a facsimile receiver, a voice frequency response device including a functional part functioning as a facsimile response unit, and a telephone line connected between the terminal unit and the voice frequency response device. The voice frequency response device comprises a voice frequency response unit transmitting a required message to the telephone in response to a demand for voice frequency response service from the telephone in the terminal unit, and a facsimile response unit transmitting necessary information in the message or other information including the necessary information to the facsimile receiver in the terminal unit. Therefore, the subscriber is freed from the cumbersome effort of writing the message, and the possibility of mishearing or miswriting leading to a future trouble can also be eliminated, thereby improving the serviceability and reliability of the system.

17 Claims, 3 Drawing Figures

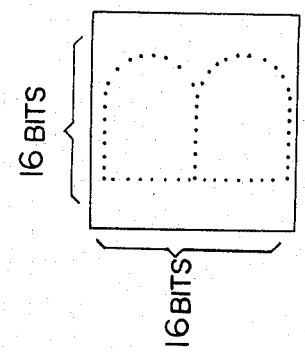
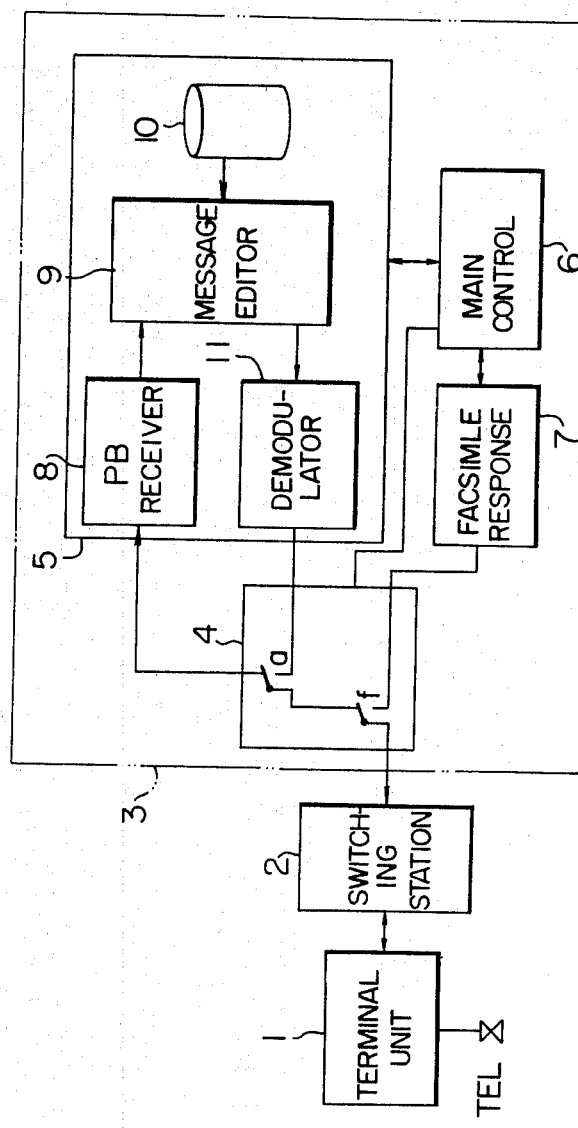

VOICE FREQUENCY RESPONSE SYSTEM

This invention relates to a voice frequency response system, and more particularly to a system of the kind above described in which a facsimile function is provided in addition to a voice frequency response function, so that a visible response with characters, patterns, etc. can be provided besides an audible response by voice.

With the progress of the information-oriented society, realization of a "man-to-machine dialogue" system has been strongly demanded, and a voice frequency response system in which a machine responds to a man by voice has recently been highlighted as a prominent example of such a dialogue system.

In a prior art voice frequency response system, a subscriber actuates a push button dial telephone or a keyboard of a subscriber's terminal unit connected to a telephone line to generate a voice frequency response service demand in the form of a multifrequency signal. This signal is applied to a central voice frequency response device which decodes the multifrequency signal to read the input information and carries out necessary processing on the basis of the input information. In order to transmit the result of processing to the subscriber, the central voice frequency response device includes a memory which stores, for example, words or short sentences therein, and selected words or short sentences are mechanically edited under control of control data applied from a processor such as a computer to appear as a voice information signal or a message signal which is transmitted from the central voice frequency response device to the subscriber's terminal unit.

However, the prior art voice frequency response system described above is only capable of making an audible response by voice. Therefore, when this prior art voice frequency response system is applied to the field of, for example, voice frequency response service for a request for reservation of a seat of a train, an airplane or the like or for a request for confirmation of a balance of a bank deposit, the subscriber hearing the message must take a note of an important content of the message since the message includes words of significance which must not be missed. The necessity for taking note of the important content of the message is quite cumbersome to the subscriber and does not offer satisfactory service to the subscriber. Further, the possibility of mishearing or miswriting the transmitted message by the subscriber may lead to a source of future trouble. Thus, the prior art voice frequency response system has not been fully reliable.

It is therefore a primary object of the present invention to provide a voice frequency response system in which a facsimile response by characters, patterns, etc. can be provided in addition to an audible response by voice so that at least that part of information which must not be missed can be preserved as a record.

In accordance with the present invention, there is provided a voice frequency response system comprising a terminal unit including both a functional part functioning as a telephone and a functional part functioning as a facsimile receiver, a voice frequency response device including a functional part functioning as a facsimile response unit, a telephone line connected between the terminal unit and the voice frequency response device, the voice frequency response device comprising voice frequency response means for transmitting a required message to the telephone in response to a demand for voice frequency response service from the telephone in the terminal unit, and facsimile response means for transmitting necessary information in the message or other information including the necessary information to the facsimile receiver in the terminal unit.

The above and other objects, features and advantages of the present invention will be apparent from the following detailed description of a preferred embodiment thereof taken in conjunction with the accompanying drawings, in which:

FIG. 1 is a block diagram of a preferred embodiment of the voice frequency response system according to the present invention;

FIG. 3 shows schematically a character or a unit pattern written previously in a ROM in the character-pattern generating circuit shown in FIG. 2.

Figure 2:
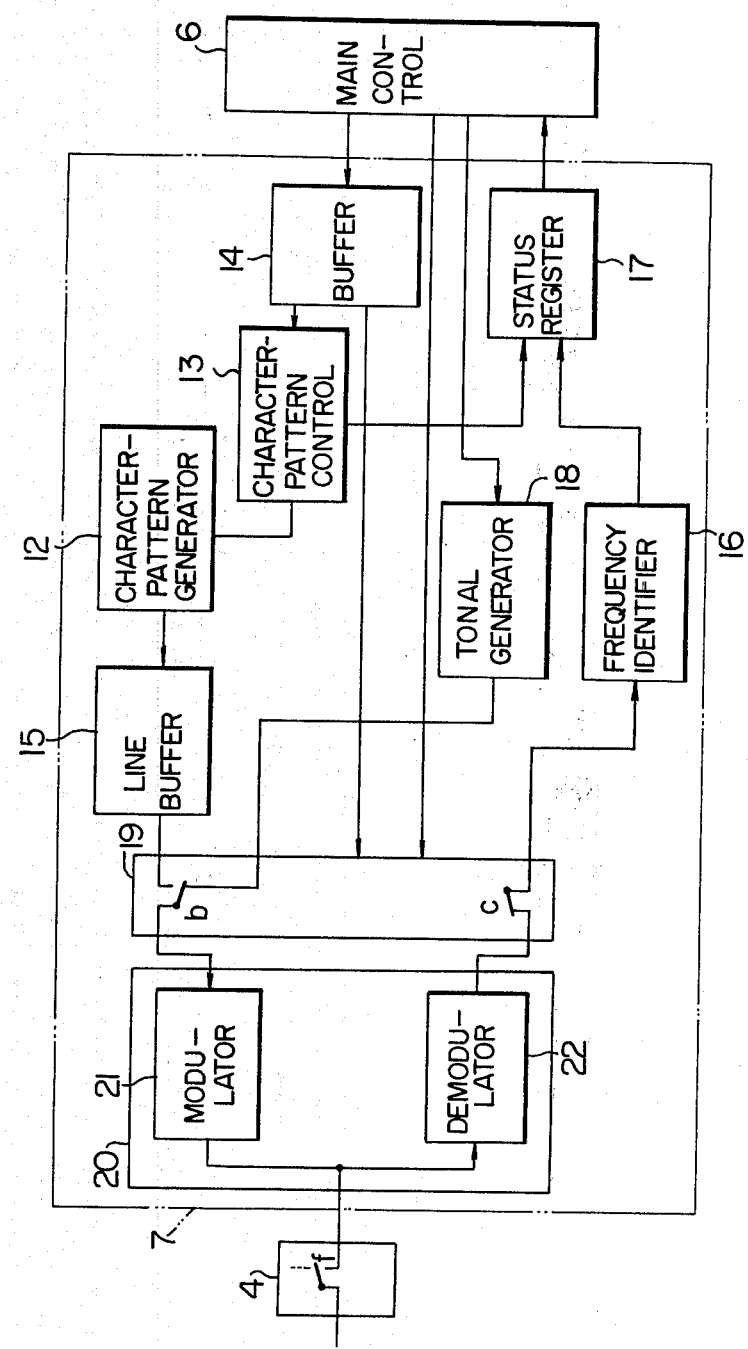
FIG. 2 is a block diagram showing in detail the structure of the facsimile response unit in the system shown in FIG. 1.

Referring now to FIG. 1, a preferred embodiment of the voice frequency response system according to the present invention comprises a subscriber's terminal unit 1 including a facsimile receiver and a push button dial telephone TEL, a telephone switching station 2, and a voice frequency response device 3. The voice frequency response device 3 includes a signal switching unit 4, a voice frequency response unit 5, a main control unit 6 and a facsimile response unit 7. The voice frequency response unit 5 includes a push button dial signal receiving circuit 8 receiving a push button dial signal (abbreviated hereinafter as a PB signal) transmitted from the telephone TEL, a message editing circuit 9, a message recording medium or drum 10 and a message demodulating circuit 11.

The operation of the voice frequency response system embodying the present invention will now be described with reference to FIG. 1.

Briefly describing, the telephone TEL in the subscriber's terminal unit 1 is manipulated to generate a PB signal demanding voice frequency response service. In response to the application of the service demand signal, necessary message elements such as words or short sentences selected from those recorded on the message recording drum 10 are edited by the message editing circuit 9 in the voice frequency response unit 5, and a pulse amplitude modulated signal (abbreviated hereinafter as a PAM signal) representing the edited message is applied to the message demodulating circuit 11 to be demodulated into an analog message signal. This analog message signal is transmitted via the signal switching unit 4 and the telephone switching station 2 to the telephone TEL in the subscriber's terminal unit 1.

Describing in more detail, the PB signal demanding the voice frequency response service generated from the telephone TEL is transmitted via the telephone switching station 2 and the signal switching unit 4 to be received by the PB signal receiving circuit 8 in which the signal is converted into a digital signal before being applied to the message editing circuit 9.

A desired facsimile signal is transmitted from the facsimile response unit 7 to the facsimile receiver in the terminal unit 1 via the signal switching unit 4 and the telephone switching station 2.

The signal switching unit 4 includes a switch a acting to switch over between the message signal transmission mode and the PB signal reception mode and a switch f acting to switch over between the voice response mode and the facsimile signal transmission mode.

All of the signal switching unit 4, the voice frequency response unit 5 and the facsimile response unit 7 are controlled by the main control unit 6.

In response to a demand for voice response service from the subscriber, the voice frequency response unit 5 transmits required voice information to the telephone TEL in the subscriber's terminal unit 1.

When there is information to be preserved as a record at hand of the subscriber after the complete transmission of the message signal from the voice frequency response unit 5, a manipulation instructing voice-frequency signal is transmitted to terminal unit 1 so that the subscriber can hear a message, for example, "PLEASE SWITCH OVER TO FACSIMILE" through his telephone TEL. At the same time, the switch f in the signal switching unit 4 is switched over to the position at which it connects the facsimile response unit 7 to the terminal unit 1 through the telephone switching station 2.

Upon hearing this manipulation instructing signal, the subscriber manipulates the start button of the facsimile receiver in the terminal unit 1 so that the telephone line is now connected to the facsimile receiver from the previous position connected to the telephone TEL. Then, the facsimile response unit 7 transmits the facsimile signal including the required character or pattern information to the facsimile receiver in the terminal unit 1 to record the character or pattern information.

The subscriber can visually accurately confirm the required information by reading the record, and he can also preserve the record for future use.

The structure of the facsimile response unit 7, which is the principal feature of the voice frequency response system according to the present invention, will now be described in further detail with reference to FIG. 2 which is a block diagram of one form of the facsimile response unit 7 employed in the system shown in FIG. 1.

Referring to FIG. 2, the facsimile response unit 7 includes a character-pattern generating circuit 12 composed of memory elements, for example, read-only memory (ROM), each memory element of which has a capacity of 16×16 bits for storing predetermined character or pattern information. An address information signal giving address information of one row of characters or unit patterns is applied from the main control unit 6 to a character-pattern control circuit 13 which stores the address information signal and specifies the addresses of the characters or unit patterns to be generated from the character-pattern generating circuit 12. The control information applied from the main control unit 6 is temporarily stored in a buffer 14 before being applied to the character-pattern control circuit 13. The character or pattern information output signal from the character-pattern generating circuit 12 represents one row of unit characters or unit patterns read out in a line sequential fashion, and a line buffer 15 is connected to the character-pattern generating circuit 12 to store one line portion of one row of the character information or pattern information at a time. The buffer 15 converts such a portion of the information into one of, for example, 18 scanning lines and generates such a scanning signal. A frequency identifying circuit 16 identifies the frequency of a line control signal transmitted from the facsimile receiver in the terminal unit 1 and applies its output signal to a status register 17. The status register 17 registers the output signal applied from the frequency identifying circuit 16 and registers also a signal indicative of an idle condition of the character-pattern control circuit 13. As soon as these signals are read by the main control unit 6, the status register 17 is cleared. A tonal signal generating circuit 18 generates a GC (group command) signal and an EOM (end of message) signal and transmits these signals to the facsimile receiver in the terminal unit 1. The facsimile response unit 7 further includes a line control circuit 19 and a modem 20. The modem 20 includes a modulator 21 and a demodulator 22. In FIG. 2, the same parts as those shown in FIG. 1 are designated by the same reference numerals.

FIG. 3 shows an example of a unit character or unit pattern written previously in a ROM element in the character-pattern generating circuit 12 shown in FIG. 2.

The facsimile function of the voice frequency response system according to the present invention will be described in detail with reference to FIGS. 2 and 3.

Various signals from the terminal unit 1 are transmitted according to an AM-PM-VSB mode (amplitude-phase modulation, vestigial side-band transmission) to be demodulated by the demodulator 22. Various signals from the facsimile response unit 7 are modulated by the modulator 21 to be similarly transmitted to the facsimile receiver in the terminal unit 1 according to the AM-PM-VSB mode.

As described hereinbefore, the manipulation instructing signal instructing by voice the manipulation of the facsimile receiver in the terminal unit 1 is transmitted to the subscriber through the telephone TEL when there is information to be reserved at the hand of the subscriber after complete transmission of the required message signal from the voice response unit 5. The subscriber hearing this manipulation instructing signal manipulates the start button of the facsimile receiver in the terminal unit 1. The connection is switched over from the telephone TEL to the facsimile receiver in the terminal unit 1. The facsimile receiver in the terminal unit 1 generates a GI (group identification) signal of, for example, 1850 Hz to indicate the fact that the facsimile receiver is ready to receive the facsimile information.

Upon arrival of the GI signal, the demodulator 22 in the facsimile response unit 7 demodulates this signal, and the demodulated signal is applied through a switch c in the line control circuit 19 to the frequency identifying circuit 16 which identifies the frequency 1850 Hz of the GI signal. The result is set in the status register 17 from the frequency identifying circuit 16.

The main control unit 6 reads the content of the status register 17 and recognizes that the facsimile receiver in the terminal unit 1 is ready to receive the facsimile information. The main control unit 6 controls the line control circuit 19 to open its switch c, and, at the same time, the tonal signal generating circuit 18 is actuated.

The tonal signal generating circuit 18 generates the GC signal of, for example, 2100 Hz to indicate the fact that a character or pattern signal is now to be transmitted to the facsimile receiver in the terminal unit 1. The GC signal passes through another switch b in the line control circuit 19 and is modulated by the modulator 21 to be transmitted via the signal switching unit 4 and the telephone switching station 2. At the same time, the switch c in the line control circuit 19 is restored to the original position or closed position.

Upon reception of the GC signal, the facsimile receiver in the terminal unit 1 generates a CFR (confirmation to receive) signal of, for example, 1650 Hz which requests transmission of the character or pattern signal.

In the facsimile response unit 7, this CFR signal is demodulated by the demodulator 22 and is then applied to the frequency identifying circuit 16 through the switch c in the line control circuit 19. The frequency identifying circuit 16 identifies the frequency of the CFR signal, and the result is set in the status register 17 from the frequency identifying circuit 16.

The main control unit 6 reads the new content of the status register 17 and confirms that the facsimile receiver in the terminal unit 1 requests transmission of the character or pattern signal. Consequently, the main control unit 6 controls the line control circuit 19 to open its switch c, and, at the same time, to change over the switch b to the position connected to the line buffer 15.

At this time, the main control unit 6 delivers an address information signal indicative of the addresses of one row portion of the necessary character or unit pattern information. This address information signal is applied via the buffer 14 to the character-pattern control circuit 13 to be stored temporarily therein.

The character-pattern control circuit 13 specifies the addresses of the characters or unit patterns to be generated from the character-pattern generating circuit 12 at a rate of 2 bytes (=16 bits). That is, it specifies the address of one line portion of each character or unit pattern at a time.

Thus, the character-pattern generating circuit 12 generates an information signal indicative of one line portion of memory information for each character or unit pattern (for example, 16 bits in the lateral direction in FIG. 3) and applies it to the line buffer 15. Such a manner of signal application is repeated until the signal indicative of the last character or unit pattern in the row and the one line portion is finally read out.

Upon complete reception of the memory information corresponding to one line portion of the characters or unit patterns in one row, the line buffer 15 converts the memory information into one of, for example, 18 scanning lines. The output signal from the line buffer 15 is applied through the switch b in the line control circuit 19 to the modulator 21, and the modulated character or unit pattern information signal is transmitted to the facsimile receiver in the terminal unit 1.

After the character-pattern control circuit 13 has completely applied the one-row address information signal to the character-pattern generating circuit 12, the result is set in the status register 17 from the character-pattern control circuit 13.

The main control unit 6 reading the new content of the status register 17 recognizes that no address information signal is now stored in the character-pattern control circuit 13, and an address information signal specifying the addresses of the characters or unit patterns in the next row is applied to the circuit 13.

The main control unit 6, buffer 14, character-pattern control circuit 13, character-pattern generating circuit 12, line buffer 15 and modulator 21 repeat such a cycle until all the required character or pattern signals are transmitted to the facsimile receiver in the terminal unit 1.

Upon complete transmission of all the required character or pattern signals, the main control unit 6 acts to release the switches b and c in the line control circuit 19, and the tonal signal generating circuit 18 transmits the EOM signal of, for example, 1100 Hz to the terminal unit 1 to indicate that all the required characters or patterns to be transmitted have been completely transmitted to the facsimile receiver in the terminal unit 1.

Upon reception of this EOM signal, the facsimile receiver in the terminal unit 1 generates an MCF (message confirmation) signal of, for example, 1650 Hz which requests disconnection of the telephone line.

This MCF signal is transmitted through the demodulator 22 and the switch c in the facsimile response unit 7 to be applied to the frequency identifying circuit 16 which identifies the frequency of the MCF signal, and the result is set in the status register 17. The main control unit 6 reading this content of the status register 17 recognizes that there is a request for disconnection of the telephone line. Then, the main control unit 6 acts to release the signal switching unit 4 to disconnect the telephone line.

While an embodiment of the present invention has been described by way of example, the present invention is in no way limited to such a specific embodiment, and various changes and modifications may be made therein without departing from the scope of appended claims.

In the aforementioned embodiment of the present invention, ROM is employed to constitute the character-pattern generating circuit 12. However, any other suitable memory may be employed in lieu thereof. Further, the capacity of each memory element of the character-pattern memory is in no way limited to 16×16 bits and may be larger or smaller than that.

The facsimile signal transmission mode is in no way limited to the AM-PM-VSB mode described in the embodiment of the present invention, and any one of other suitable transmission modes may be selected depending on the type of the facsimile receiver in the terminal unit. Thus, the present invention includes employment of, for example, an AM-DBS mode (amplitude modulation, double side-band transmission with a carrier), an AM-BSS mode (amplitude modulation, both side-band transmission without a carrier), an AM-VSB mode (amplitude modulation, vestigial side-band transmission), an AM-PM-DSB mode (amplitude-, phase modulation, double side-band transmission with a carrier), an AM-PM-DSB mode (amplitude-, phase modulation, both side-band transmission without a carrier), an AFS mode (amplitude-frequency shift transmission), or an FS mode (frequency shift transmission).

The frequency of the telephone line control signal such as the GI signal is in no way limited to the specified value and may have any other suitable value within the operating frequency range of the telephone system.

The number of scanning lines is also not limited to 18 and may be suitably selected to meet required accuracy of recording.

It will be understood from the foregoing detailed description of the present invention that not only audible response service by a message can be provided for a subscriber, but also a record of important information in the message can be reserved at hand of the subscriber in the form of characters, patterns, etc. Therefore, the present invention eliminates the prior art requirement for cumbersome writing and also obviates the source of future trouble due to miswriting or mishearing of the message. The present invention can thus greatly improve the serviceability and reliability of the voice frequency response system.

What is claimed is:

1. A voice frequency response system comprising
a terminal unit including both a functional part functioning as a telephone and a functional part functioning as a facsimile receiver;
a voice frequency response device; and
a telephone line connected between said terminal unit and said voice frequency response device;
said voice frequency response device comprising voice frequency response means for transmitting a required message to said telephone in response to a demand for voice frequency response service from said telephone in said terminal unit and facsimile response means for transmitting character-pattern information in at least a part of said message to said facsimile receiver in said terminal unit.

2. A voice frequency response system as claimed in claim 1, wherein a subscriber's line in a telephone switching station forms said telephone line, and the message including said character-pattern information is transmitted via the subscriber's line in the telephone switching station.

3. A voice frequency response system as claimed in claim 1, wherein said voice frequency response device further includes signal switching means connected between said telephone line and said voice frequency response means and facsimile response means for switching over said telephone line between said voice frequency response means and said facsimile response means, and main control means for controlling said voice frequency response means, said facsimile response means and said signal switching means.

4. A voice frequency response system as claimed in claim 3, wherein said facsimile response means comprises a character-pattern generating circuit including memory means for storing predetermined character-pattern information, a character-pattern control circuit connected to said character-pattern generating circuit and said main control means for receiving and storing character-pattern address information applied from said main control means specifying the addresses of the character-pattern information stored in said character-pattern generating circuit, a buffer connected to said main control means and said character-pattern circuit for temporarily storing character-pattern address information from said main control means for application to said character-pattern generating circuit, a line buffer for converting the output from said character-pattern generating circuit into scanning line information in a line sequential fashion for each row of the generated character-pattern information and for delivering an output to said signal switching means indicative of the scanning line information, a frequency identifying circuit responsive to a line control signal from said facsimile receiver in said terminal unit for identifying the frequency of the line control signal, a status register connected to said frequency identifying circuit and said character-pattern control circuit for storing the output from said frequency identifying circuit and an idle condition of said character-pattern control circuit, said status register being cleared after the contents thereof have been read by said main control means, a tonal signal generating circuit responsive to said main control means for transmitting to said telephone line via said signal switching means a line control signal required for controlling said facsimile receiver, and a modem connected to said signal switching means for modulating and demodulating the signals transmitted and received over said telephone line, respectively.

5. A voice frequency response system as claimed in claim 4, wherein said memory means of said character-pattern generating circuit comprises a read-only memory having a memory capacity corresponding to the number of facsimile scanning lines and recording density with which each character or unit pattern is scanned and recorded.

6. A voice frequency response system as claimed in claim 4, wherein said character-pattern control circuit receives and stores character-pattern address information applied from said main control unit in a row sequential fashion and specifies the addresses of the individual characters or unit patterns in said character-pattern generating circuit in a line sequential fashion.

7. A voice frequency response system as claimed in claim 4, wherein said character-pattern generating circuit delivers memory information of individual characters or unit patterns in a line sequential fashion, and said line buffer which receives and stores said memory information converts the character information or unit pattern information in each row into scanning line information in a line sequential fashion.

8. A voice frequency response system using a telephone line comprising:
a subscriber's terminal unit connected to one side of said telephone line, said terminal unit including a telephone for requesting voice frequency response service and a facsimile receiver for receiving character-pattern information; and
a voice frequency response device connected to the other side of said telephone line, said voice frequency response device including a voice frequency response unit for transmitting a message including voice frequency response information to said telephone via said telephone line, a facsimile response unit for transmitting character-pattern information in at least a part of said message with said voice frequency response information to said facsimile receiver, a signal switching unit functioning as an input/output stage and including switch means by which said voice frequency response unit is selectively connected to said telephone line for transmitting said voice frequency response information and by which said facsimile response unit is selectively connected to said telephone line for transmitting said character-pattern information, and a main control unit for controlling the transmissions of said voice frequency response information and said character-pattern information and for controlling the operation of said switch means.

9. A voice frequency response system as claimed in claim 8, wherein said telephone includes means for transmitting a PB signal via said telephone line to said voice frequency response device as a demand signal for said voice frequency response service.

10. A voice frequency response system as claimed in claim 8, wherein said voice frequency response information includes at the end thereof a manipulation instructing signal for indicating that said telephone line is to be connected to said facsimile receiver in said terminal unit.

11. A voice frequency response system as claimed in claim 10, wherein said facsimile receiver transmits a first information signal indicating that said facsimile receiver is ready to receive said character-pattern information as said telephone line is connected to said facsimile receiver in said terminal unit in response to said manipulation instructing signal.

12. A voice frequency response system as claimed in claim 11, wherein said facsimile response unit comprises means for transmitting a second information signal indicating that said character-pattern information is to be transmitted in response to said first information signal, means for receiving a third information signal transmitted by said facsimile receiver after said facsimile receiver has received said second information signal, means for transmitting a fourth information signal corresponding to said character-pattern information to said facsimile receiver in response to said third information signal, means for transmitting a fifth information signal indicating that said fourth information signal has been completely transmitted to said facsimile receiver in response to the completion of transmission of said fourth information signal and means for receiving a sixth information signal transmitted by said facsimile receiver indicating that said facsimile receiver has received said fifth information signal.

13. A voice frequency response system as claimed in claim 12, wherein said facsimile response unit comprises a demodulator for receiving and demodulating said first, third and fifth information signals, a frequency identifying circuit connected to said demodulator for receiving an output signal from said demodulator and for identifying the frequency thereof, a first switch disposed between said demodulator and said frequency identifying circuit and controlled by said main control unit, a character-pattern transmitting circuit for transmitting said fourth information signal as said main control unit identifies a signal from said frequency identifying circuit as said third information signal, a tonal signal generating circuit for transmitting said second information signal as said main control unit identifies a signal from said frequency identifying circuit with said first information signal and for transmitting said fifth information signal as said main control unit recognizes the completion of transmission of said fourth information, a second switch disposed in an output circuit of said character-pattern transmitting circuit and said tonal signal generating circuit and for alternatively delivering one of said outputs from said character-pattern transmitting circuit and said tonal signal generating circuit in response to said main control unit, and a modulator connected to said second switch for modulating the outputs from said character-pattern transmitting circuit and said tonal signal generating circuit.

14. A voice frequency response system as claimed in claim 13, wherein said character-pattern transmitting circuit comprises a character-pattern generating circuit including memory means for storing predetermined character-pattern information, a buffer for temporarily storing address information applied from said main control unit, a character-pattern control circuit connected between said character-pattern generating circuit and said buffer, said character-pattern control circuit receiving and storing said address information from said buffer thereby specifying the addresses of the character-pattern generating circuit, and a line buffer for converting the output from said character-pattern generating circuit into scanning line information in a line sequential fashion for each row of said character-pattern information and for applying said scanning line information to said second switch; wherein said facsimile response unit further comprises a status register connected between said character-pattern control circuit and said main control unit, said status register being set when said character-pattern control circuit has completed the transmission of said address information into said character-pattern generating circuit and being cleared when said main control unit has recognized that said status register has been set, said main control unit transmitting successive address information into said buffer as said main control unit has recognized said setting of said status register.

15. A voice frequency response system as claimed in claim 14, wherein said memory means of said character-pattern generating circuit comprises a read-only memory having a memory capacity corresponding to the number of facsimile scanning lines and recording density with which each character or unit pattern is scanned and recorded.

16. A voice frequency response system as claimed in claim 14, wherein said character-pattern control circuit receives and stores character-pattern address information applied from said main control unit in a row sequential fashion and specifies the addresses of the individual characters or unit patterns in said character-pattern generating circuit in a line sequential fashion.

17. A voice frequency response system as claimed in claim 14, wherein said character-pattern generating circuit delivers memory information of individual characters or unit patterns in a line sequential fashion, and said line buffer which receives and stores said memory information converts the character information or unit pattern information in each row into scanning line information in a line sequential fashion.

* * * * *